United States Patent
Delaney et al.

(10) Patent No.: US 6,931,499 B2
(45) Date of Patent: Aug. 16, 2005

(54) METHOD AND APPARATUS FOR COPYING DATA BETWEEN STORAGE VOLUMES OF STORAGE SYSTEMS

(75) Inventors: William P. Delaney, Wichita, KS (US); William A. Hetrick, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 369 days.

(21) Appl. No.: 10/210,384

(22) Filed: Aug. 1, 2002

(65) Prior Publication Data

US 2004/0024977 A1 Feb. 5, 2004

(51) Int. Cl.[7] .............................................. G06F 13/00
(52) U.S. Cl. ...................... 711/154; 711/114; 711/161; 711/162; 711/168; 711/170; 711/201; 714/6; 707/204; 715/521
(58) Field of Search .............................. 711/114, 201, 711/161, 162, 154, 165, 170, 173, 172, 168, 171; 715/521; 714/6; 707/204

(56) References Cited

U.S. PATENT DOCUMENTS

| | | | | |
|---|---|---|---|---|
| 5,742,792 A | * | 4/1998 | Yanai et al. | 711/162 |
| 6,073,218 A | * | 6/2000 | DeKoning et al. | 711/150 |
| 6,148,412 A | * | 11/2000 | Cannon et al. | 714/6 |
| 6,275,898 B1 | * | 8/2001 | DeKoning | 711/114 |
| 6,467,023 B1 | * | 10/2002 | DeKoning et al. | 711/114 |
| 6,618,794 B1 | * | 9/2003 | Sicola et al. | 711/154 |
| 6,651,154 B1 | * | 11/2003 | Burton et al. | 711/202 |
| 6,772,302 B1 | * | 8/2004 | Thompson | 711/162 |
| 6,813,687 B1 | * | 11/2004 | Humlicek | 711/114 |
| 2003/0187818 A1 | * | 10/2003 | McCarty et al. | 707/1 |

* cited by examiner

*Primary Examiner*—Mano Padmanabhan
*Assistant Examiner*—Jasmine Song
(74) *Attorney, Agent, or Firm*—Duft Bornsen & Fishman, LLP

(57) ABSTRACT

The present invention provides systems and methods for copying and/or transferring stored data of one storage volume of a storage system to another storage volume while enabling requests to the storage volumes. The systems and methods may be particularly useful in RAID storage systems. One system includes a detector configured for detecting an amount of the stored data copied from the one storage volume to the other storage volume based on a boundary marker of the storage volumes. The boundary marker may indicate an amount of the stored data copied from the one storage volume to the other storage volume. A processor is communicatively connected to the detector for processing requests to the storage volumes according to rules based on the boundary marker. A file generator may generate a log file of the requests. The log file may be stored in the other storage volume thereby minimizing a need for external storage devices.

22 Claims, 4 Drawing Sheets

METHOD AND APPARATUS FOR COPYING DATA BETWEEN STORAGE VOLUMES OF STORAGE SYSTEMS

BACKGROUND OF THE INVENTION

1. Field of the Invention

The present invention is generally directed toward a method and an apparatus for copying data within a storage system or between storage systems. More specifically, the present invention relates to copying stored data of one storage volume to another storage volume.

2. Discussion of Related Art

A computing environment typically includes a storage system for storing data. Storage systems generally subdivide storage capacity into distinct storage volumes also referred to as LUNs. One example of a storage system may include a Redundant Array Of Independent Disks (RAID) storage system that has many LUNs distributed over a plurality of disks. An example of a single disk in the array is a hard disk drive as typically found in a personal computer. In a RAID storage system, each storage volume is managed in accordance with a selected RAID management technique. In other words, each LUN uses a different RAID management level as required for its particular application. A storage volume is as small as a partition of a single computer disk or non-volatile random access memory device, or as large as a section of storage space of a vast storage system containing multiple computer disks, or even multiple disks distributed physically over a communications network. Requests are made by host systems to manage the storage volumes and to access data stored in the storage volumes. The requests often include input/output (I/O) requests that write to and/or read from the storage volumes.

A typical sequence in configuring LUNs involves a user, such as a system administrator, defining storage space to create a particular LUN. With the storage space so defined, a storage management technique is associated with the newly created LUN. One example of the storage management technique is a RAID storage management, such as RAID level 5. The storage space of the LUN is then initialized with a process that involves formatting the storage space associated with the LUN to clear any previously stored data. In the RAID storage system, the process also involves initializing any redundancy information required by the associated RAID management level. Requests to the LUN are made during the initialization process of the LUN, as described in U.S. patent application Ser. No. 09/274,582, commonly owned by LSI logic Corporation and incorporated by reference herein.

In the RAID storage system, information is stored across multiple disks. The information includes redundant data provided by a host system as well as redundant data generated and managed by the RAID storage system. The information is often stored on the disks through a process called "striping". Striping spreads the information across the disks as storage volumes and enhances the reliability and/or performance of the storage system. For example, when information is lost on one disk of the array, the storage system continues to operate using redundant information from other disks of the array.

The RAID storage system has many storage volumes distributed throughout the disks of the array. Generation and management of the storage volumes are transparent to applications on the host system. An example of a host system includes a host operating system, such as Windows developed by Microsoft Corporation. Access to data on the disks is gained through I/O operations, such as reading and writing. Storage controllers that are usually internal to the storage subsystem process these I/O operations. A user working in a host operating system environment of a computer views the multiple disks as a single disk. The disks are viewed as a single disk since the information of the RAID storage system, including distribution of information, is independent of and transparent to the host operating system that is coupled to the RAID storage system.

Since information is redundantly stored, the RAID storage system can operate in a reduced or degraded mode that allows users to continue accessing the information despite a temporary loss of one of the disk drives in the array. The missing information associated with the inoperable disk drive is constructed from the information stored on the other disk drives of the array. The information stored in other disk drives of the array is also used to reconstruct the missing information upon initialization, repair, or replacement of the lost disk drive. The RAID storage system structure and operation increases the mean-time-between-failures and makes the RAID storage system more fault tolerant.

While the RAID storage system allows access during normal and degraded modes, access to particular storage volumes is precluded during managerial operations of the RAID storage system. Access to particular storage volumes of other types of storage systems is similarly precluded during managerial operations. For example, a user, such as a system administrator, often needs to move data of one storage volume of a particular storage system to another storage volume of the storage system. I/O requests to the two storage volumes are prevented during the move to assure data integrity of the storage volumes. The moves are often necessary to have the information available on new and improved disks as the storage system is upgraded. The moves are also necessary to manage and more evenly distribute loads placed on the storage system by spreading accessible information across more disks.

Preventing I/O requests to storage volumes that are in the process of moving data seriously affects the capability of a storage system. A prevention of I/O requests degrades the storage system so as to limit its effectiveness. A limited storage system is unacceptable in a business environment that demands high reliability and availability. For example, a degraded storage system used in security business environments can allow security breaches to occur during periods of "down" time.

As evident from the above discussion, a need exists for improved structures and methods for copying data between storage volumes of a storage system so as to reduce down time.

SUMMARY OF THE INVENTION

The present invention solves the above and other problems and advances the state of the useful arts by providing an apparatus and a method for copying stored data between storage volumes, or LUNs, of a storage system, or between storage systems. More specifically, the present invention provides for copying stored data between the storage volumes while enabling processing of I/O requests to the storage volumes.

Once initialized, a newly created LUN may be managed by the system administrator to store data as desired. In one aspect of the invention, stored data from the LUNs can be copied to other LUNs within the storage system while allowing requests to be made to the LUNs. The requests may include I/O requests to the LUNs, such as read and write requests. For example, the system administrator may wish to transfer and/or copy stored data from one LUN to another LUN to more evenly distribute loads placed on the storage system. The I/O requests to the LUNs may be supported during the transfer of the stored data.

In one exemplary preferred embodiment of the invention, a detector is configured for detecting an amount of the stored data that is copied from one storage volume of the storage system to another storage volume based on a boundary marker of the one storage volume. In another exemplary preferred embodiment of the invention, the detector is configured for detecting an amount of the stored data that is copied based on a boundary marker of the other storage volume. The boundary markers may be located at addresses in the two storage volumes that indicate the amount of the stored data that has been copied. A processor may be communicatively connected to the detector for processing requests to the storage volumes according to rules based on the boundary markers of each storage volume. Again, the requests may include I/O requests that read from and/or write to the storage volumes during the transfer of stored data. However, other requests, such as control requests to the storage volumes, may be included as well.

The boundary markers of the two storage volume may establish first and second storage spaces within the storage volumes. The first and second boundary markers may move within the storage volumes as the stored data is copied. For example, the boundary markers may represent a gauge that enables the system administrator to ascertain the amount of the stored data that has transferred from one storage volume to another.

The rules for processing the requests may include processing the requests to the first storage space of the first storage volume based on the boundary markers and an address of the stored data to be acted upon by the request. The rules may also include processing the requests to the second storage spaces of the first and second storage volumes based on the boundary markers and the address of the stored data to be acted upon by the request. The first storage space of each of the storage volumes may be identified as having addresses above that of the boundary marker. The second storage space of each of the storage volumes may be identified as having addresses below that of the boundary marker. For example, if a write operation is to an address of data at or below the boundary markers, data may be written to both storage volumes since the stored data being copied is presently located in the two storage volumes. If the write operation is to an address of data above the boundary marker, for example, the data may be written to the storage volume that is being copied since the stored data has not yet been copied.

In another exemplary preferred embodiment of the invention, potential interruptions to copying of the stored data from one storage volume to another is overcome with a log file of requests. For example, when a storage system experiences a temporary outage, such as a temporary power outage, during copying, the log file of requests may serve as a buffer to temporarily store requests to the storage volumes. When normal operations of the storage system return, the log file may be accessed to determine the last request that was made to the storage volumes, thereby serving as a recovery point for request operations. The storage log may be stored in one of the storage volumes involved in the process of copying the stored data.

In an exemplary preferred embodiment, the log file is stored in the first storage space of the storage volume to where the stored data is being copied. The log file may be stored in the first storage space at an address furthest from the boundary marker. As the stored data being copied encroaches the address of the log file, requests may be denied so as to prevent overwriting the log file with the request during copying. Denied requests to the storage volume may be queued for future processing. While the requests are queued, any remaining stored data of the first storage volume may be copied to the second storage volume, thereby overwriting the log file, which is no longer of use. After the stored data has completed copying to the second storage volume, the second storage volume may be newly identified as the first storage volume, a process that is substantially transparent to an end user. Queued requests may then be routed to the newly identified first storage volume. Any further requests may also be routed to the to the newly identified first storage volume.

In one aspect of the invention, a method of copying stored data of a first storage volume to a second storage volume includes steps of establishing a first boundary marker in the first storage volume that indicates an amount of the stored data copied from the first storage volume to the second storage volume and processing requests to the first and second storage volumes according to rules based on the first boundary marker.

In another aspect of the invention, the method includes a step of establishing a second boundary marker in the second storage volume relative to the first boundary marker, the first boundary marker establishing first and second storage spaces of the first storage volume and the second boundary marker establishing first and second storage spaces of the second storage volume.

In another aspect of the invention, the method includes a step of moving the first and second boundary markers as the stored data is copied from the first storage volume to the second storage volume.

In another aspect of the invention, the step of processing includes a step of evaluating a first rule that initiates processing the requests to the first storage space of the first storage volume and a second rule that initiates processing the requests to the second storage spaces of the first and second storage volumes, the requests including input/output requests.

In another aspect of the invention, the method includes a step of storing a log file of the input/output requests in the first storage space of the second storage volume to provide a recovery point for an interruption to the method of copying.

In another aspect of the invention, the method includes a step of queuing the requests as the method of copying approaches completion.

In another aspect of the invention, the method includes a step of identifying the second storage volume as the first storage volume upon completion of the method of copying.

In another aspect of the invention, the method includes a step of routing queued requests to the second storage volume upon completion of the method of copying.

In one aspect of the invention, a system for copying stored data of a first storage volume to a second storage volume includes a detector configured for detecting an amount of the stored data copied from the first storage volume to the second storage volume based on a first boundary marker in the first storage volume that indicates an amount of the stored data copied from the first storage volume to the second storage volume and a processor communicatively connected to the detector for processing requests to the first and second storage volumes according to rules based on the first boundary marker.

In another aspect of the invention, the detector includes a boundary marker generator configured for establishing the first boundary marker and for establishing a second boundary marker in the second storage volume relative to the first boundary marker, the first boundary marker establishing first and second storage spaces of the first storage volume and the second boundary marker establishing first and second storage spaces of the second storage volume.

In another aspect of the invention, the processor includes a decision module configured for evaluating a first rule that initiates processing the requests to the first storage space of the first storage volume and a second rule that initiates processing the requests to the second storage spaces of the first and second storage volumes, the requests including input/output requests.

In another aspect of the invention, the system includes a recorder communicatively connected to the processor for queuing the requests as copying of the stored data approaches completion.

In another aspect of the invention, the system includes a router communicatively connected to the second storage volume for routing queued requests to the second storage volume upon completion of copying of the stored data.

In another aspect of the invention, the system includes a log file generator communicatively connected to the processor for generating and storing a log file of the requests in a first storage space established by a boundary marker of the second storage volume to provide a recovery point for an interruption to copying.

Advantages of the invention include assuring data integrity of the storage volumes while stored data is being copied and/or transferred from one storage volume to another. Other advantages include enabling requests, such as I/O requests, to the storage volumes without a need for a separate resource, such as Non Volatile Static Random Access Memory (NVSRAM) or a battery powered memory.

BRIEF DESCRIPTION OF THE PREFERRED EMBODIMENTS

DETAILED DESCRIPTION OF THE PREFERRED EMBODIMENTS

Figure 1:
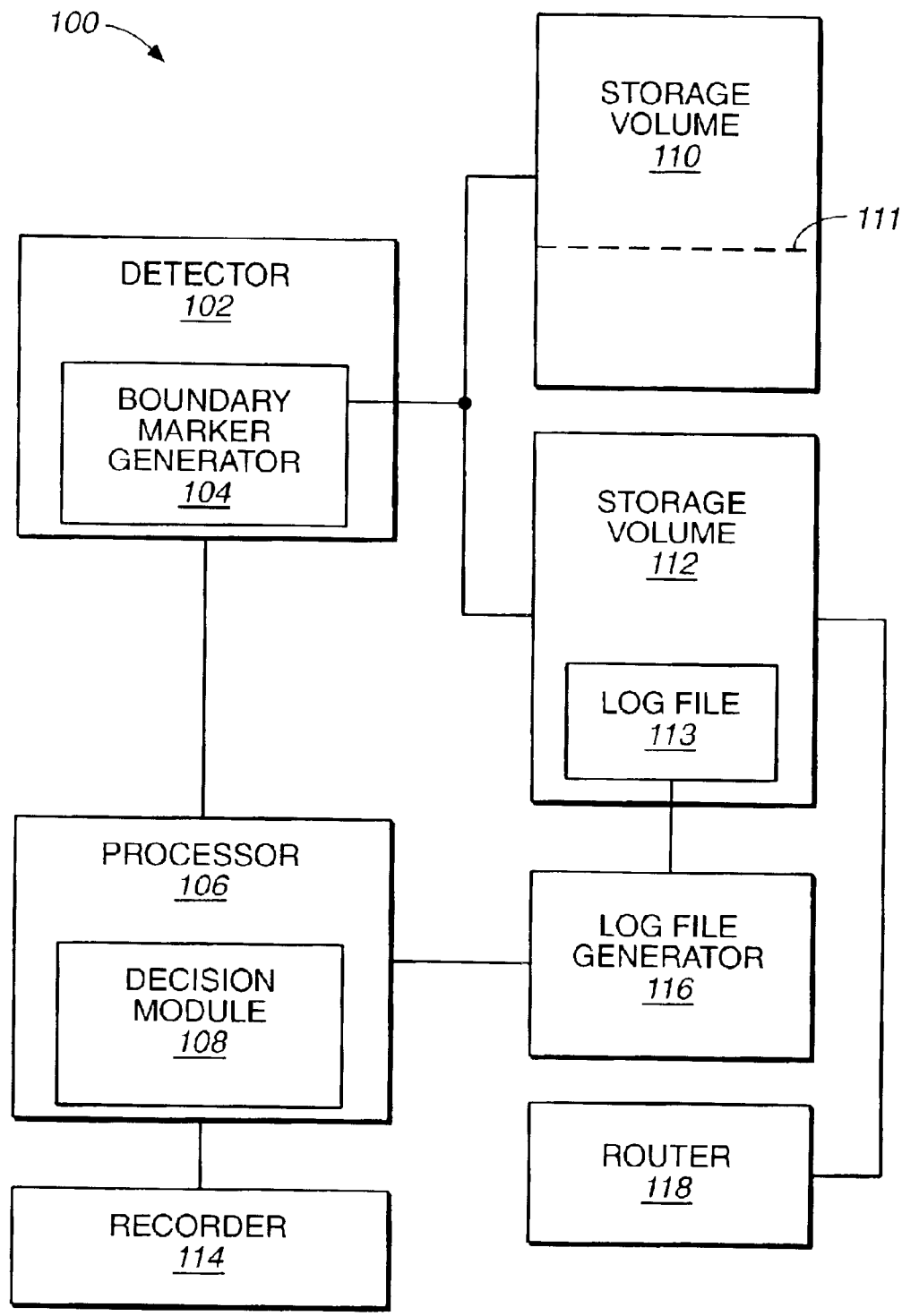
FIG. 1 is a block diagram illustrating an exemplary preferred embodiment of the invention.

While the invention is susceptible to various modifications and alternative forms, a specific embodiment thereof has been shown by way of example in the drawings and will herein be described in detail. Those skilled in the art will appreciate that the features described below can be combined in various ways to form multiple variations of the invention. As a result, the invention is not limited to the specific examples described below, but only by the claims and their equivalents.

With reference now to the figures and in particular with reference to FIG. 1, an exemplary preferred embodiment of the invention is shown in system 100. System 100 is configured to copy stored data of storage volume 110 to storage volume 112. Storage volumes 110 and 112 may be LUNs within a single disk and/or a LUN distributed over a plurality of disks. An example of a plurality of disks may be found in a RAID storage system. System 100 includes detector 102, processor 106, recorder 114, log file generator 116, and router 118. System 100 may include a plurality of storage volumes, such as storage volumes 110 and 112, and is not intended to be limited to a number of storage volumes in the exemplary embodiment. For example, stored data of one or more storage volumes may be copied and/or transferred to another one or more storage volumes.

In system 100, detector 102 is configured for detecting an amount of the stored data copied from storage volume 110 to storage volume 112 based on boundary marker 111. Boundary marker 111 may be located at an address of storage volume 110 and indicate an amount of the stored data copied and/or transferred from storage volume 110 to storage volume 112. In system 100, processor 106 is communicatively connected to detector 102 for processing requests to the storage volume 110 according to rules based on boundary marker 111.

In one exemplary preferred embodiment of the invention, detector 102 includes boundary marker generator 104 configured for establishing boundary marker 111. Boundary marker generator 104 may additionally establish a boundary marker in storage volume 112, discussed below in FIG. 2. In another exemplary preferred embodiment of the invention, processor 106 includes decision module 108 configured for evaluating the rules. The rules may initiate processing the requests to storage spaces established by the boundary markers of storage volumes 110 and 112, also discussed below in FIG.2. In system 100, recorder 114 is communicatively connected to processor 106 for queuing the requests as copying of the stored data approaches completion. In system 100, router 118 is communicatively connected to storage volume 112 for routing queued requests to storage volume 112 upon completion of copying the stored data from storage volume 110. In system 100, log file generator 116 is communicatively connected to processor 106 for generating and storing log file 113 of the requests in a first storage space established by the boundary marker of the second storage volume to provide a recovery point for an interruption to copying. For example, a power failure may interrupt copying of storage volume 110 to storage volume 112 while requests are being processed to both storage volumes 110 and 112. The requests, therefore, may have been only processed for storage volume 110, thereby updating portions of storage volume 110 that have already been copied to storage volume 112 and leaving storage volume 112 incorrectly unaffected. Thus, the request log may maintain a recovery point in which the requests to each of storage volumes 110 and 112 can be determined in case of an interruption. Once restarted after the interruption, processor 106 may access log file 113 to process pending requests to each of storage volumes 110 and 112, thereby recovering the pending requests directed to each of storage volumes 110 and 112.

Figure 2:
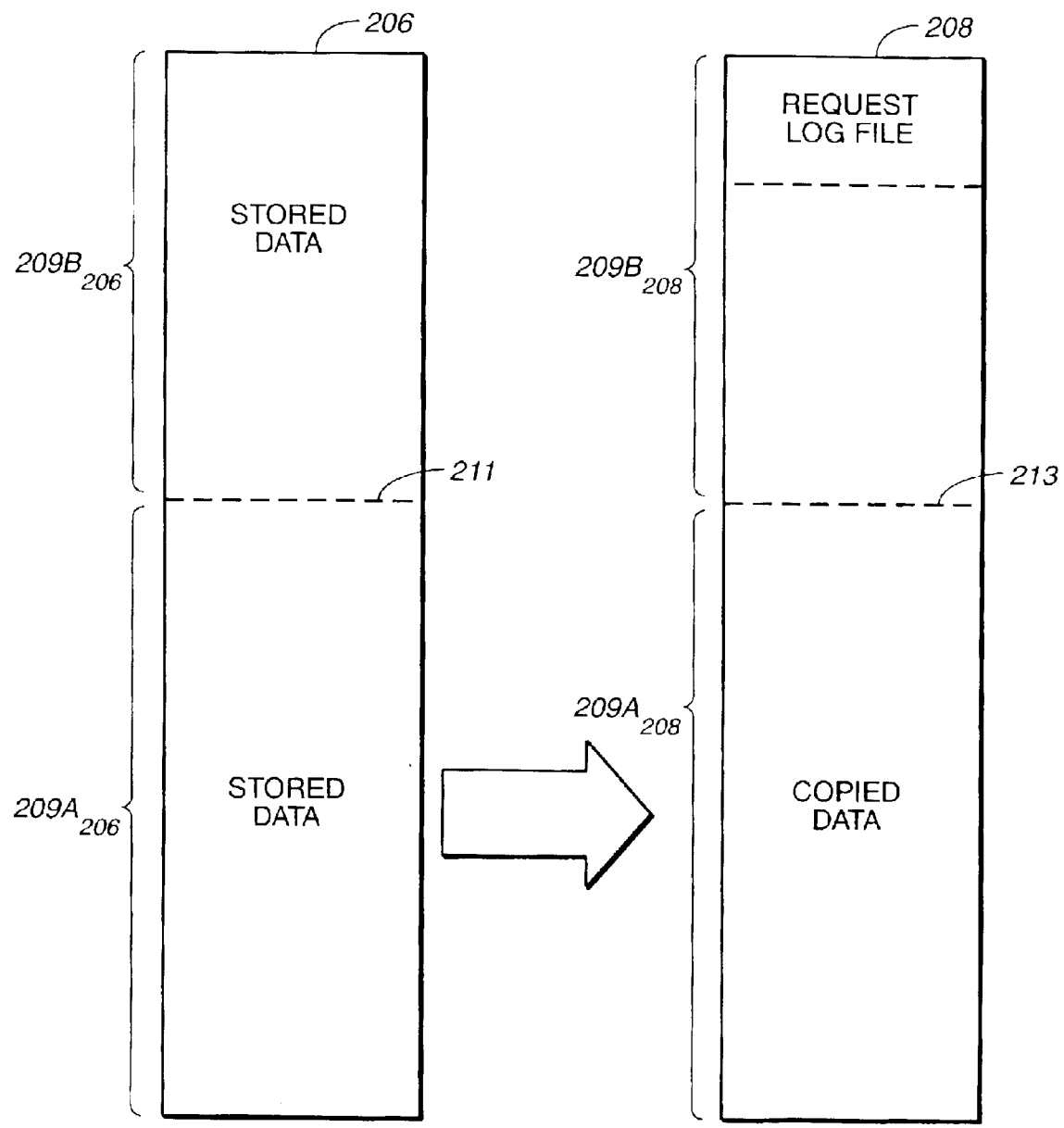
FIG. 2 is a block diagram illustrating another exemplary preferred embodiment of the invention.

FIG. 2 shows an exemplary preferred embodiment of storage volumes 206 and 208. Boundary marker generator 104 of FIG. 1 may establish boundary marker 211 in storage volume 206 and boundary marker 213 in storage volume 208. Storage volume 206 may be divided into storage spaces $209A_{206}$ and $209B_{206}$ by boundary marker 211. Storage volume 208 may be divided into storage spaces $209A_{208}$ and $209B_{208}$ by boundary marker 213. Storage volumes 206 and 208 may occupy the same amount of storage space. Boundary markers 211 and 213 may be located at the same address locations relative to the total amount of storage space of each of storage volumes 206 and 208. Thus, storage spaces $209A_{206}$ and $209A_{208}$ may have the same amount of storage space, storage spaces $209B_{206}$ and $209B_{208}$ as well may have the same amount of storage space. The address of storage spaces $209A_{206}$ and $209A_{208}$ may be considered lower addresses relative to respective boundary markers 211 and 213, for example, and the addresses of storage spaces $209B_{206}$ and $209B_{208}$ may be considered higher addresses.

Log file generator 116 of FIG. 1, may generate a log file, such as log file 113 of FIG. 1. The log file may store the requests, such as I/O requests, in storage space $209B_{208}$. The address location of the log file may be at an address point of storage space $209B_{208}$ furthest from boundary marker 213 while maintaining a pre-determined amount of storage capable of storing the requests. The log file may provide a recovery point for an interruption to copying of the stored data from storage volume 206 to storage volume 208. Storing the log file in storage space $209B_{208}$ may further minimize a need for external storage devices such as a NVSRAM or a battery powered memory.

Decision module 108 may evaluate rules for processing the requests to storage volumes 206 and 208. A first rule may initiate processing the requests to the storage space $209B_{206}$. A second rule may initiate processing the requests to the storage spaces $209A_{206}$ and $209A_{208}$. For example, as stored data is being copied from storage volume 206 to storage volume 208, an I/O request, such as a write request, to stored data may be processed by processor 106. Decision module 108 may determine the intended address of the stored data to be acted upon by the I/O request based upon information of boundary markers 211 and 213. If the address of the stored data to be acted upon is at an address lower than boundary markers 211 and 213, processor 106 may process the I/O requests to both of storage spaces $209A_{206}$ and $209A_{208}$. Processor 106 may process the I/O requests to both of storage spaces $209A_{206}$ and $209A_{208}$ to maintain data integrity of storage volumes 206 and 208, since the stored data being copied is located in both storage volumes. If the address of the stored data to be acted upon is at an address equal to or higher than boundary markers 211 and 213, processor 106 may process the I/O requests to storage space $209B_{206}$, since the stored data has not yet been copied to storage space $209B_{208}$ and should not be affected by the I/O request. As the stored data is copied and/or transferred from storage volume 206 to storage volume 208, boundary marker generator 104 may adjust each of boundary markers 211 and 213 to indicate an amount of the stored data copied and/or transferred from storage volume 206 to storage volume 208.

As the stored data being copied reaches the address of the log file in storage space $209B_{208}$, recorder 114 may queue the requests to the stored data of storage volumes 206 and 208 until the stored data is completely copied. While the requests are queued, the stored data of storage volume 206 may copy over the log file of storage volume 208. Possible interruptions to the copying of the stored data may be minimized, since the duration of copying an amount of the stored data having a size of the log file is small relative to the size of the overall storage volumes. Once the stored data has completed copying from storage volume 206 to storage volume 208, processor 106 may identify storage volume 208 as storage volume 206 such that router 118 may properly route the requests.

Figure 3:
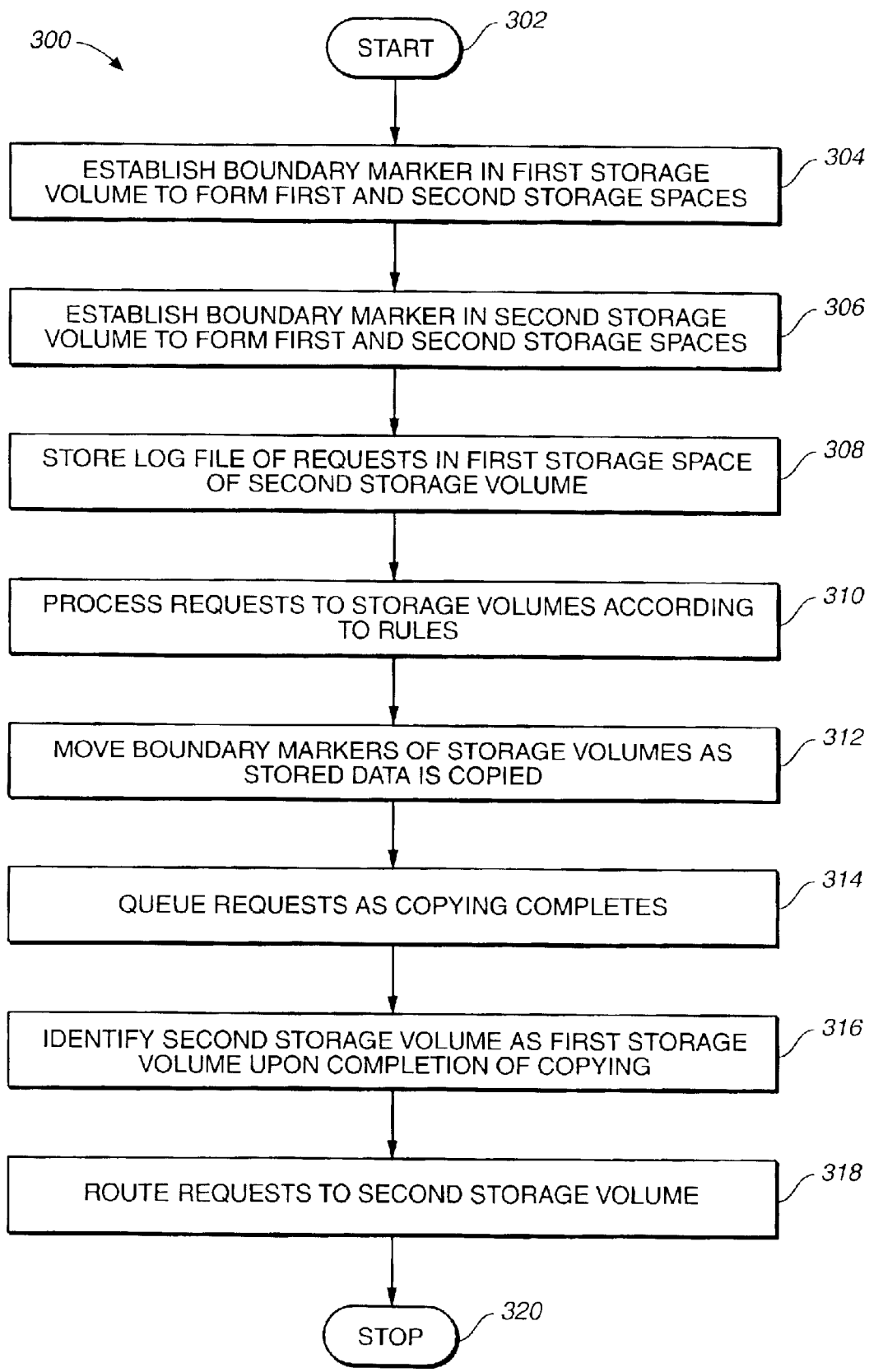
FIG. 3 is a flow chart diagram illustrating an exemplary preferred operation of the invention.

FIG. 3 illustrates exemplary preferred operation 300 of system 100 of FIG. 1. Operation 300 commences, in step 302. Boundary marker generator 104 of detector 102 may establish boundary marker 211 in storage volume 206 to form storage spaces $209A_{206}$ and $209B_{206}$, in step 304. Boundary marker generator 104 may establish boundary marker 213 in storage volume 208 to form storage spaces $209A_{208}$ and $209B_{208}$, in step 306. Boundary markers 211 and 213 may indicate an amount of the stored data copied from storage volume 206 to storage volume 208. Log file generator 116 may generate a log file of requests to storage volumes 206 and 208, in step 308, and store the log file of requests in storage volume 208. The requests may include I/O requests. Processor 106 may process the requests to storage volumes 206 and 208 according to rules, in step 310. Decision module 108 of processor 106 may evaluate the rules as discussed in FIGS. 1 and 2. Boundary marker generator 104 may move boundary markers 211 and 213 as the stored data is copied from storage volume 206 to storage volume 208, in step 312. Recorder 114 may queue the requests to storage volumes 206 and 208 as copying of the stored data approaches completion, in step 314. Processor 106 may identify storage volume 208 as storage volume 206 upon completion of copying of the stored data, in step 316. Router 118 may route queued requests to storage volume 208 upon completion of copying of the stored data, in step 318. Operation 300 ends in step 320.

Figure 4:
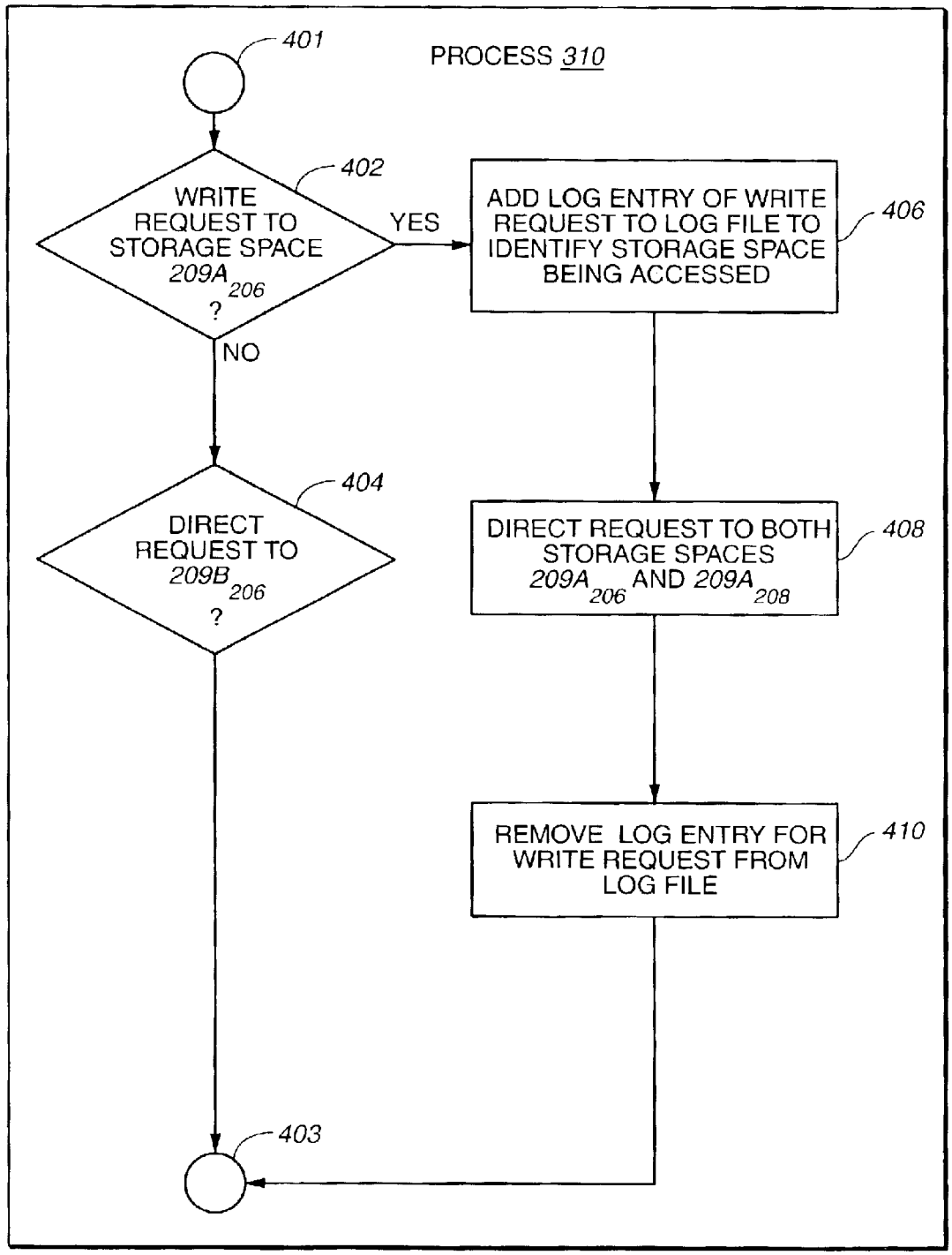
FIG. 4 is a flow chart diagram illustrating an exemplary preferred step of the operation of the invention.

FIG. 4 illustrates an exemplary preferred embodiment of process step 310 of the operation of FIG. 3. Step 310 enters through entry point 401. Decision module 108 may determine if a write request is intended for storage space $209A_{206}$, in decision block 402. If the write request is not intended for storage space $209A_{206}$, processor 106 may direct the write request to storage space $209B_{206}$, in step 404. Upon completing step 404, step 310 exits through exit point 412.

If the write request is intended for storage space $209A_{206}$, processor 106 may enter a log entry into log file 208 to identify the storage spaces is being accessed by the write request, in step 406. Processor 106 may direct the write request to both of storage spaces $209A_{206}$ and $209A_{208}$, in step 408. Processor 106 may remove the log entry from the request log upon completion of step 408, in step 410. Upon completing step 410, step 310 exits through exit point 412.

Those skilled in the art will understand that other methods can be used to copy and/or transfer stored data from storage volume 206 to storage volume 208 that fall within the scope of the invention.

Instructions that perform the operations of FIGS. 3 and 4 can be stored on storage media. The instructions can be retrieved and executed by a microprocessor. Some examples of instructions are software, program code, and firmware. Some examples of storage media are memory devices, tapes, disks, integrated circuits, and servers. The instructions are operational when executed by the microprocessor to direct the microprocessor to operate in accord with the invention. Those skilled in the art are familiar with instructions and storage media.

Advantages of the invention include assuring data integrity of storage volumes while stored data is being copied and/or transferred from one storage volume to another. Other advantages include enabling requests, such as I/O requests, to the storage volumes without a need for a separate resource, such as a NVSRAM or a battery powered memory.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed:

1. A method of copying all stored data of a first storage volume to a second storage volume, including steps of:
    establishing a first boundary marker in the first storage volume that indicates an amount of the stored data copied from the first storage volume to the second storage volume; and
    processing requests to the first and second storage volumes according to rules based on the first boundary marker while copying of all stored data continues.

2. The method of claim 1, further including a step of establishing a second boundary marker in the second storage volume relative to the first boundary marker, the first boundary marker establishing first and second storage spaces of the first storage volume and the second boundary marker establishing first and second storage spaces of the second storage volume.

3. The method of claim 2, further including a step of moving the first and second boundary markers as the stored data is copied from the first storage volume to the second storage volume.

4. The method of claim 2, wherein the step of processing includes a step of evaluating a first rule that initiates processing the requests to the first storage space of the first storage volume and a second rule that initiates processing the requests to the second storage spaces of the first and second storage volumes, the requests including input/output requests.

5. The method of claim 4, further including a step of storing a log file of the input/output requests in the first storage space of the second storage volume to provide a recovery point for an interruption to the method of copying.

6. The method of claim 1, further including a step of queuing the requests as the method of copying approaches completion.

7. The method of claim 1, further including a step of identifying the second storage volume as the first storage volume upon completion of the method of copying.

8. The method of claim 1, further including a step of routing queued requests to the second storage volume upon completion of the method of copying.

9. A system for copying all stored data of a first storage volume to a second storage volume, including:
    a detector configured for detecting an amount of the stored data copied from the first storage volume to the second storage volume based on a first boundary marker in the first storage volume that indicates an amount of the stored data copied from the first storage volume to the second storage volume; and
    a processor communicatively connected to the detector for processing requests to the first and second storage volumes according to rules based on the first boundary marker wherein the processor is adapted to continue processing requests during the copying of all data.

10. The system of claim 9, wherein the detector includes a boundary marker generator configured for establishing the first boundary marker and for establishing a second boundary marker in the second storage volume relative to the first boundary marker, the first boundary marker establishing first and second storage spaces of the first storage volume and the second boundary marker establishing first and second storage spaces of the second storage volume.

11. The system of claim 10, wherein the processor includes a decision module configured for evaluating a first rule that initiates processing the requests to the first storage space of the first storage volume and a second rule that initiates processing the requests to the second storage spaces of the first and second storage volumes, the requests including input/output requests.

12. The system of claim 9, further including a recorder communicatively connected to the processor for queuing the requests as copying of the stored data approaches completion.

13. The system of claim 9, further including a router communicatively connected to the second storage volume for routing queued requests to the second storage volume upon completion of copying of the stored data.

14. The system of claim 9, further including a log file generator communicatively connected to the processor for generating and storing a log file of the requests in a first storage space established by a boundary marker of the second storage volume to provide a recovery point for an interruption to copying.

15. A system for copying all stored data of a first storage volume to a second storage volume, including:
    means for establishing a first boundary marker in the first storage volume that indicates an amount of the stored data copied from the first storage volume to the second storage volume; and
    means for processing requests to the first and second storage volumes according to rules based on the first boundary marker wherein the means for processing is adapted to continue processing requests during the copying of all data.

16. The system of claim 15, further including means for establishing a second boundary marker in the second storage volume relative to the first boundary marker, the first boundary marker establishing first and second storage spaces of the first storage volume and the second boundary marker establishing first and second storage spaces of the second storage volume.

17. The method of claim 16, further including means for moving the first and second boundary markers as the stored data is copied from the first storage volume to the second storage volume.

18. The system of claim 16, wherein the means for processing includes means for determining a first rule that initiates processing the requests to the first storage space of the first storage volume and a second rule that initiates processing the requests to the second storage spaces of the first and second storage volumes, the requests including input/output requests.

19. The system of claim 18, further including means for storing a log file of the input/output requests in the first storage space of the second storage volume to provide a recovery point for an interruption to the method of copying.

20. The system of claim 15, further including means for queuing the requests as the method of copying approaches completion.

21. The system of claim 15, further including means for identifying the second storage volume as the first storage volume upon completion of the method of copying.

22. The system of claim 15, further including means for routing queued requests to the second storage volume upon completion of the method of copying.

* * * * *